United States Patent [19]
Ofer

[11] Patent Number: 5,892,955
[45] Date of Patent: Apr. 6, 1999

[54] CONTROL OF A MULTI-USER DISK STORAGE SYSTEM

[75] Inventor: Erez Ofer, Brookline, Mass.

[73] Assignee: EMC Corporation, Hopkinton, Mass.

[21] Appl. No.: 710,745

[22] Filed: Sep. 20, 1996

[51] Int. Cl.$^6$ .............................. G06F 13/00; G06F 13/16
[52] U.S. Cl. .......................... 395/726; 395/728; 395/856; 711/163
[58] Field of Search ...................................... 395/726, 728, 395/729, 856, 857, 650, 200.14; 74/163

[56] References Cited

U.S. PATENT DOCUMENTS

| | | | |
|---|---|---|---|
| 5,423,044 | 6/1995 | Sutton et al. ............................. | 395/726 |
| 5,592,673 | 1/1997 | Kurabayashi et al. ................... | 395/726 |
| 5,669,002 | 9/1997 | Buch ........................................ | 395/726 |

*Primary Examiner*—Meng-Ai T. An
*Assistant Examiner*—Rupal D. Dharia
*Attorney, Agent, or Firm*—Fish & Richardson P.C.

[57] ABSTRACT

A method and apparatus control operation of a disk drive array system which is accessible to a plurality of host computers over a SCSI bus. In accordance with the invention, an Inquiry command, configured to set a global semaphore or hardware lock for reserving exclusive control of the disk array, is sent to the disk system over the SCSI bus from a first host system. The disk drive system responds to the Inquiry command by setting the global semaphore if the global semaphore has not already been set. The disk drive system stores an identification of the host which sets the semaphore and reserves exclusive use of the control functions on the disk drive system for that host. The disk drive system then sends an Inquiry command response back to the host identifying a current holder of the semaphore. The host can also send other commands inquiring of the identity of the owner of the global semaphore, releasing its ownership of the global semaphore, and, if a maximum available predetermined time interval has passed, forcing either the reservation or release of the global semaphore. In this manner, synchronized use of the control functions of the disk drive system is maintained even though the host computers might otherwise have been able to corrupt or interfere with each other's competing applications and accesses.

20 Claims, 3 Drawing Sheets

| INQUIRY COMMAND FORMAT: | BYTE | MEANING | |
|---|---|---|---|
| | 0 | OP-CODE | 12H |
| | 1 | EVPD BIT (0) | 0XH |
| FIG. 2 | 2 | PAGE CODE | 00H |
| | 3 | SIGNATURE | 00H |
| | 4 | LENGTH | FFH |
| | 5 | CONTROL BYTE | 00H |

Bytes 0–5 bracketed as 200.

FIG. 3

| BYTE | MEANING |
|---|---|
| 00 | 00 |
| 01 | PAGE CODE |
| 02 | 00 |
| 03 | ADDITIONAL LENGTH |
| 04 | 00 |
| 05 | CODE DATE: MONTH |
| 06 | CODE DATE: DAY |
| 07 | CODE DATE: YEAR |
| 08-09 | CODE REV |
| 10-11 | MTPF LEVEL |
| 12-15 | CODE TYPE |
| 16-19 | CONSTANT SIGNATURE: 'EMC_' |
| 20-23 | CONSTANT SIGNATURE: 'SYMM' |
| 24-27 | APPLICATION SIGNATURE |
| 28-31 | TIME STAMP |

Bytes 00–15 bracketed as 202; bytes 16–31 bracketed as 204.

CONTROL OF A MULTI-USER DISK STORAGE SYSTEM

BACKGROUND OF THE INVENTION

The invention relates generally to disk storage systems, and more particularly, to a method and apparatus for controlling a disk storage system in which multiple users can connect to and access the disk storage system.

Traditionally, disk storage systems, in particular disk arrays, were passive storage devices making large amounts of magnetic disk storage available to the host computers connected to them. As the speed of the interconnections between hosts and arrays increases, as the arrays themselves grow in size, and, as the arrays become more intelligent, it is increasingly more likely that multiple hosts could simultaneously access and use, and/or change, the same disk file or data or attempt to control the whole system. Accordingly, data could be corrupted if, while a first host computer is modifying the data, a second host computer also attempts to read and/or modify the data, or obtain control of the whole array. Some mechanism for establishing synchronization between the different hosts must be provided to ensure that two or more different applications will not be able to perform control operations on the disk array in overlapping time intervals.

A typical interconnection bus between the hosts and the disk array is a SCSI bus. The SCSI command library is well defined, and has a command to perform a reserve operation (reserve-SCSI 16H and release-SCSI 17H). Unfortunately, however, this command only operates on a single device and is used in association with normal read and write operations. Therefore, no SCSI command is available which performs the needed "reserve" operation to reserve the whole disk array to a single host computer or application for performing a control operation on the array, for example setting perma-cache, re-allocating devices, etc. These are control operations that affect the state of the whole disk array. They must be performed only by one host at a time. Thus, a mechanism is needed to "reserve" the whole disk array for performing such a control operation.

SUMMARY OF THE INVENTION

According to the invention, each application or host computer has the ability to reserve the disk array (in whole or in part) for itself for a period of time during which it is performing operations on the array. In this way, the applications do not destructively compete with each other for disk array attention. Each application, according to the invention, attempts to reserve for itself an internal semaphore (referred to as a "global semaphore") before it performs its operations. Once an application has received or acquired the global semaphore, other hosts are locked out (a condition sometimes referred to herein as "hardware lock") and the application which has the global semaphore, that is which "owns" the hardware lock, performs its operations. If the global semaphore is not received, the application will later poll the disk array to check if the semaphore is free.

According to the invention, a method for controlling a disk drive array system accessible to a plurality of host computers or applications over a SCSI bus features the steps of sending to the disk drive system over the SCSI bus from a first host system, a command to set a global semaphore for reserving exclusive control of the disk drive system (or at least a portion of the disk drive system); responding to the setting command by setting the global semaphore when the semaphore is not already set (and thus not belonging to another application or system); storing an identification of the host setting the semaphore; reserving exclusive control of the disk drive system (or requested portion thereof) to the host computer setting the semaphore; sending a release command from the first host computer to the disk drive system to release or reset the global semaphore and to make the disk drive system (or previously reserved portion thereof) available to other host systems for control purposes and responding to the release command by resetting the global semaphore.

In particular embodiments of the invention, the method features, in addition to the normal setting and release commands, a forced release and a forced reservation command to force the disk drive system to release or reserve the hardware lock or semaphore if a maximum time duration for the pending reservation has been exceeded. In a particular embodiment, the bus is a SCSI bus, and the request and reservation commands use the SCSI Inquiry command with the VPD bit set. The disk drive system then responds with a requested VPD page. The VPD page is created from the parameters stored, for example, in a disk drive system buffer.

The apparatus for controlling a disk drive array system accessible to a plurality of host computers over one or more SCSI buses features a disk drive controller connected to the SCSI bus or buses through a plurality of ports, for receiving and responding to SCSI commands from the host computers, a hardware locking circuit in the disk drive array system for controlling operation of the disk drive array, a storage buffer for storing SCSI defined vendor data, circuitry at the host computer for initiating a SCSI inquiry command for vendor product data (VPD) stored in the buffer, the inquiry including a switch for requesting a global semaphore hardware lock and a unique identification of the application making the request. The disk drive controller, in response to the inquiry, grants the hardware lock when another application has not secured the hardware lock, and returns to the originating host a vital product data (VPD) page including an identification of the current holder of the hardware lock.

In another aspect, the host computer has a mechanism for forcing a release, or a reservation, of the hardware lock which has been in place for at least a predetermined maximum time duration; and the controller, in response to receipt of an inquiry, which includes a request for the forced release or reservation of the global semaphore or hardware lock, determining whether the time duration has elapsed. If the maximum time interval has elapsed, the controller reserves or releases ownership of the hardware lock as requested.

In particular embodiments, the returned vital product data (VPD) page contains at least an identification of which host computer, if any, owns the hardware lock, and the identification includes the port used by the owning host computer, and a unique, host supplied identifier identifying the owner, if any, of the hardware lock.

Accordingly, operation of the disk drive system by a plurality of host computers is organizationally logical and time-synchronized so that two or more hosts are not simultaneously performing control operation on the array. While in the description which follows, a single hardware lock is provided, and that hardware lock is applied to the entire disk array system, in other embodiments of the invention more than one hardware lock can be employed, and each hardware lock can be associated with a portion of the disk storage system. Further, the portion associated with each lock can be fixed, or can be dynamically altered by either the controller or the host computers.

BRIEF DESCRIPTION OF THE DRAWINGS

Other objects, features, and advantages of the invention will be apparent from the following description taken together from the drawings in which:

FIG. 2 is a description of an Inquiry command instruction format;

FIG. 3 illustrates a particular vital product data (VPD) page in accordance with a particular embodiment of the invention.

DESCRIPTION OF A PARTICULAR PREFERRED EMBODIMENT

Figure 1:
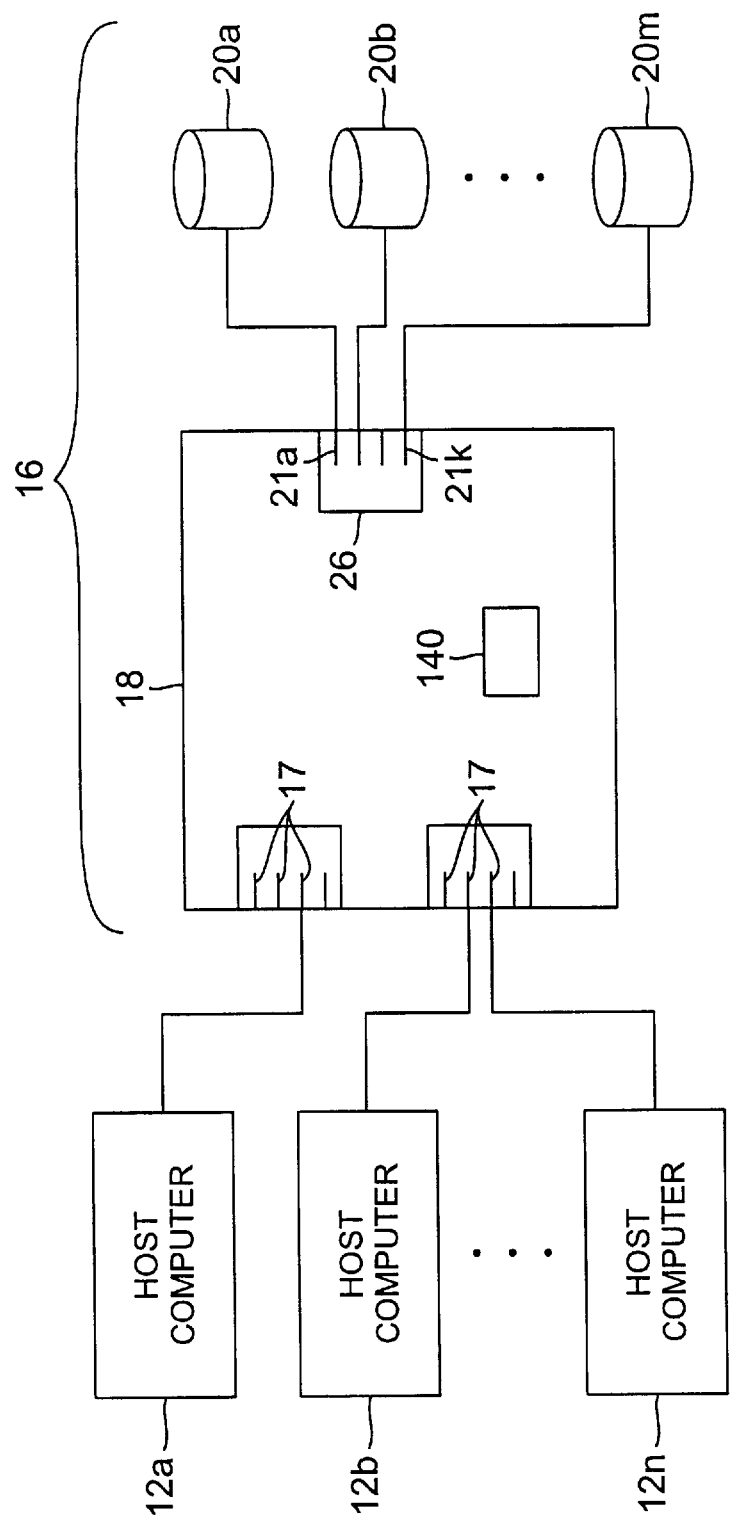
FIG. 1 is a block diagram of the system in accordance with the invention.

Referring to FIG. 1, a plurality of host computers, 12a, 12b, ..., 12n connect to a disk drive system 16 at ports 17, over buses 14, for example buses using a SCSI protocol. The disk drive system 16 has a disk drive controller 18, such as the Symmetrix® controller system manufactured by EMC Corporation, and a plurality of disk drive elements 20a, 20b, ... 20m, which connect to ports 21 of controller 18. In this particular embodiment, controller 18 has a plurality of channel directors 24 having ports 17, and disk directors 26 having a plurality of ports 21a, ..., 21k. Accordingly, communications between the host computers 12 and the disk drive controller 18 can take place according to a SCSI protocol as is well defined by the SCSI standard.

In normal operation, absent any other mechanism, more than one host computer 12 can access and/or attempt to control, through different ports, the controller 18 to read/write data or the system 16 to set perma-cache, re-allocate devices, etc. They may access or attempt to control the same or different locations or operations within the disk drive array. In any case, two independently implemented operations from different applications running on different host computers could interfere with each other, causing at best slower response for each system, and at worse corrupting the data stored or to be stored in the mass memory disk system.

According to the invention, therefore, a synchronization or control for performing control operations on the disk drives is provided. The method and apparatus of the invention provide the ability for each application to reserve the disk drive system exclusively for itself for a period of time during which the application is performing control operations on the system. In this manner, the system prevents applications from destructively competing with each other. Each application therefore, attempts to reserve the disk drive system by setting a semaphore internal to the system, called a global semaphore, before it performs its control operations. If the application cannot reserve the disk drive array, it polls the disk drive system later to check whether the disk drive system is available. If it can reserve the disk drive system, it then performs the operations which it requires.

While in the described embodiments, the entire array is reserved by an application, it will be apparent to those practiced in this field that in other embodiments of the invention different reservation systems using the inventive concept can be achieved. Thus, for example, different host computer applications can "reserve" different aspects of the disk drive system; different applications can implement a reservation system at the disk drive controller employing a first-in, first-out or priority mechanism; and other methodologies can be employed as required by the particular system. The preferred embodiment of the invention, having a single reservation system using a single global semaphore to reserve an entire disk drive system is particularly desirable and convenient with current systems since no modification of the controller system hardware needs to be made.

Since there is no SCSI command available to perform the needed disk array reserve operation, in accordance with the invention, the method uses one of the EVPD pages of the SCSI Inquiry command. (The SCSI reserve command, as noted above, only operates on single device and is used in association with normal read and write operations. This is not acceptable for performance under the described methodology.)

The SCSI Inquiry command has two operating modes. In a first mode, the "standard" mode, the Inquiry command returns general information about a device. In its second mode, the Inquiry command returns a VPD (vital product data) page. These are special inquiry pages that the device can use to return special information, or to perform special operations. VPD pages are distinguished from standard SCSI pages by the setting of the "EVPD (enable VPD) bit" in the Inquiry command plus specifying a specific VPD page number. Referring to FIG. 2, the format of an Inquiry command is illustrated and in FIG. 3, a VPD page, useful, in particular, with the present invention, is illustrated.

Figure 4:
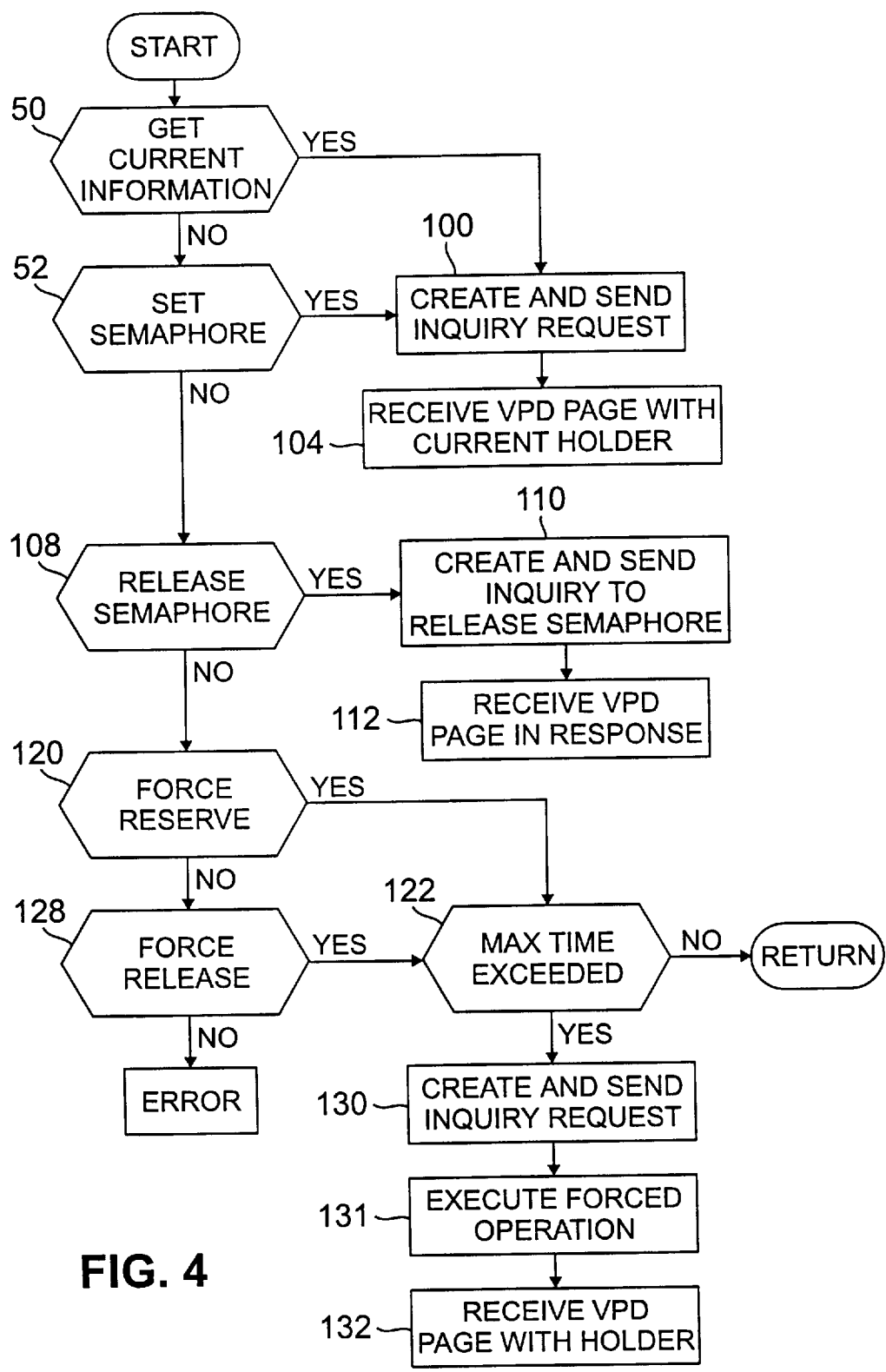
FIG. 4 is a flow chart of the operation of the host computers and the disk storage array in accordance with a particular embodiment of the invention.

Referring now to FIG. 4, when an application is ready to perform control operations on the disk array, it can be designed to either first read the current semaphore holder or owner at 50, or attempt to reserve the semaphore at 52. In response to the Inquiry command, sent at 100, the disk drive system returns to the host computer a specific VPD page (in the illustrated embodiment of the invention the page code is "FE"), which will contain an identification of the current semaphore holder. If the original inquiry was a Status or Get Information request, that is all that occurs. This is indicated at 104. If the request had been a Reserve or Set request, the VPD data indicates either that the semaphore is held by another application, in which case the identify of the holder will be other than the application which initiated the Reserve request, or the identity of the semaphore holder will be that of the requesting application, in which case the requesting application will have "reserved" the system and a hardware lock will be implemented to lock out any other application from accessing the system.

In sending either a request to read the identity of the current semaphore holder or to reserve the semaphore, and hence create a hardware lock limiting access to the system by any other application, the originating application inserts into the Inquiry command an identification identifying that application. This identification is used by the disk array controller to determine the identity of the requesting user and the current holder of the semaphore, if any.

There are three other Inquiry commands which can be implemented in accordance with the preferred embodiment of the invention. The first, indicated at 108, is a Release semaphore command. When this command is provided at 110, and it too includes the identification of the originating application, the semaphore is released if it is currently held by the application issuing the Release command and a VPD page is sent, at 112.

There is further provided in accordance with the invention, two "force" operations, a Force Reserve command (at step 120) which forces a reservation of the semaphore in the event that the current holder has exceeded a maximum time duration (tested at 122) with the result that the semaphore is reserved for the originating application; and a Force Release command (at step 128) which forces a release of the semaphore in the event the current holder of the semaphore has exceeded a maximum time duration; but in this instance, the originating application does not reserve the semaphore for itself.

In accordance with the invention, all applications must, therefore, agree on some consistent method of identification to allow them to be unambiguously identified. Once this method is in place, each application which wants to initiate special operations on the drive system will first reserve the semaphore, then perform the operation, and then release the semaphore. When the application encounters a locked semaphore it will keep polling the semaphore until it becomes available, at which time it will issue its Reserve command.

In addition, as noted above, if an application has not released the disk array by a time greater than some agreed upon maximum time interval, that is, if a maximum use time is exceeded and the semaphore is still locked, any new application will be able to use the "forced" versions of the commands to free the locked semaphore and to thereafter take over exclusive control of the disk array. The Force commands are first processed to determine whether the maximum time interval for an application lock has been exceeded. If it has been exceeded, the lock is released and a new application lock can be inserted in its place (steps 130–132).

Since, in the illustrated embodiment of the invention, commands to reserve the disk array can come from any of a number of different channel storage directors 24, each of those directors having a different port or ports 17, the disk controller stores the port and director information internally, as locking information, which it uses at a later time. That information includes both the director and the port through which the request arrived, as well as the time stamp of the lock, that is when the lock began (note all systems must use a common time standard), and the identification (word) provided by the application. This information is stored in a buffer 140 of a system (any standard available buffer location in the storage unit will suffice), and provides, in effect, the unique hardware lock identification required to grant exclusive control to the application which has reserved the system.

Accordingly, at the disk drive system, when an Inquiry command is received, and is decoded, the controller first compares the identification provided by the application issuing the command, (including port and director identification) with the identity of the application owning or holding the semaphore. If they are different, the system returns the specified VPD page which includes the identity of the current holder of the application. If there is no current holder of the application, then the system writes to the buffer the information identified above, plus a new time stamp, and returns, in the VPD page, the issuing application's identification. This is how the issuing application "knows" that it has now reserved, or can reserve, the system. The Release command operates to clear the application identification from the buffer.

Thus, in a particular embodiment of the invention useful over a SCSI bus, referring to FIG. 2, at 200 there is illustrated the format for the Inquiry command in a particular embodiment. The value of the nibble "X" in byte 1 determines the operation requested as described below.

The format for the Inquiry command thus has a number of "free spaces", and these spaces provide the special functionality for this command. The bits of nibble "X" thus act as switches, and are used as follows:

BIT1:
  0-Get Information
  1-Set Information
BIT2:
  0-RELEASE
  1-RESERVE
BIT3:
  0-NORMAL
  1-FORCED Byte 3 is used to identify the sender of the command.

"Get Information" instructs the disk drive system to simply return the requested VPD page of information. This is the status command and corresponds to BIT 1 equal to "0". In this command, BITs 2 and 3 are "don't care" bits.

When BIT 1 is set to a "1", thereby requesting the setting or changing of information and typically a change of ownership of the global semaphore, the disk drive system will always still return the requested VPD page of information to the originating requester, the page indicating the current holder of the semaphore. That current holder will either be, as noted above, the originating host computer if a Reserve command, "normal or forced", can be effected, or the current holder in the event the reserve command cannot be effected. If the command is a Release command, either normal or forced, the identity of the current holder of the semaphore will be set to a special "don't care" state meaning that the semaphore is not owned or held by anyone.

FIG. 3 illustrates the standard header 202 for a returned VPD page (the first sixteen bytes) together with the data values placed in the next sixteen bytes. In the illustrated embodiment, the "Page Code" identifies the VPD page being addressed, "Additional Length" is the length of additional data provided after the first four bytes of the header, "Code Date" is the date of the code operating in the disk drive system, "Code REV" is the revision level of that code, and "MTPF Level" is the number of the last PTF applied to the system microcode. "MTPF Level" can be used to trace back the code patch revision running on the system. "Code Type" is a long word identifying the specific code type. Appended to this information, in the illustrated embodiment of the invention, are 16 bytes, 204, including the signature of both the vendor (in this case EMC) and the disk drive system model, in this case "SYMM" for Symmetrix, and the "Application Signature" identifying the application by a four byte identifier (including, "L" in the first byte, the system channel director number in the second byte, the port number in the third byte, and the identification provided in the Inquiry command from the application in the fourth byte). Finally, the return page includes a "Time Stamp" which is the time at which the semaphore was locked by the current holder. This provides a unique identification of the current holder so that the application can determine whether or not the originator of the Inquiry command is that holder. The availability of the time stamp also provides the method whereby the maximum time duration associated with the lock can be compared to the actual time the lock has been in place.

EXAMPLES

In the examples that follow, BIT1, BIT2, and BIT3 refer to the bits of byte 1 of the Inquiry command. After the identity of the bits, the nature of the returned VPD page is described.

1. BIT1: 0-Get Information
BIT2: Don't Care
BIT3: Don't Care
The page returned reflects the current holder of the semaphore.

2. BIT1: 1-Set Information
BIT2: 1-RESERVE
BIT3: 0-NORMAL
The Disk Drive System will check if the semaphore is free. If it is, the requesting application will get it. The new semaphore holder will be reflected in the returned page.

3. BIT1: 1-Set Information
BIT2: 0-RELEASE
BIT3: 0-NORMAL

The Disk Drive System will check if the semaphore is held by the application requesting the release. If it is, then the semaphore will be released. If it is not, the semaphore will remain with the original application holding it. The returned page will reflect the old holder.

4. BIT1: 1-Set Information
BIT2: 1-RESERVE
BIT3: 1-FORCE

The Disk Drive System will force the semaphore to be the new one regardless of the current holder if the maximum time is exceeded. The returned page will reflect the new holder.

5. BIT1: 1-Set Information
BIT2: 0-RELEASE
BIT3: 1-FORCE

The Disk Drive System will force the semaphore to be freed regardless of the current holder if the maximum time is exceeded. The returned page will reflect no holder.

As noted above, additions, deletions, and other modifications of the described particular embodiments will be apparent to those practiced in this art, and are within the scope of the following claims.

What is claimed is:

1. A method for controlling a disk drive array system accessible to a plurality of host computers connected to the system over at least one bus comprising the steps of sending to the disk drive system over the bus from a first host a system command configured to set a global semaphore for reserving exclusive control of the disk drive system, responding to said command, at the disk drive system, by setting said global semaphore, when said semaphore is not already set, storing, at the disk drive system, an identification of the host setting the semaphore including information provided by the host, reserving, at the disk drive system, exclusive control of said disk drive system to the host computer setting said semaphore, sending a second command from the first host to said disk drive system configured to release said global semaphore and to make said disk drive system available, and responding, at the disk drive system, to said second command by resetting said global semaphore.

2. The method of claim 1 further comprising the steps of responding to said first command, when the semaphore is already set, with a response indicating the old semaphore holder.

3. A method for controlling a disk drive array system accessible to a plurality of host computers connected to the system over at least one bus comprising the steps of sending to the disk drive system over the bus from a first host a system command configured to set a global semaphore for reserving exclusive control of the disk drive system, responding to said command by setting said global semaphore, when said semaphore is not already set, storing an identification of the host setting the semaphore including information provided by the host, reserving exclusive control of said disk drive system to the host computer setting said semaphore, sending a second command from the first host to said disk drive system configured to release said global semaphore and to make said disk drive system available, responding to said second command by resetting said global semaphore, sending a command configured as a Forced Release to the disk drive system from a second host for forcibly releasing the disk drive system by resetting said semaphore, and resetting said semaphore at said disk drive system in response to said Forced Release command if a predetermined time duration from the last setting of said semaphore has passed.

4. The method of claim 3 further comprising the steps of sending said first command and said Forced Release command over an enabled vital product data (EVPD) Inquiry command on a SCSI bus, and sending said response from the disk drive system to the host computer over a vital product data page.

5. A method for controlling a disk drive array system accessible to a plurality of host computers connected to the system over at least one bus comprising the steps of sending to the disk drive system over the bus from a first host a system command configured to set a global semaphore for reserving exclusive control of the disk drive system, responding to said command by setting said global semaphore, when said semaphore is not already set, storing an identification of the host setting the semaphore including information provided by the host, reserving exclusive control of said disk drive system to the host computer setting said semaphore, sending a second command from the first host to said disk drive system configured to release said global semaphore and to make said disk drive system available, responding to said second command by resetting said global semaphore, sending a command from a host computer to the disk drive system configured as a Forced Reserve command for forcing a semaphore reserve command, and setting the global semaphore with the identification of the host computer sending the Forced Reserve command if a predetermined maximum time duration from a last setting of the semaphore has passed, thereby releasing the original semaphore and setting a new semaphore.

6. Apparatus for controlling a disk drive array system accessible to a plurality of host computers over at least one bus comprising a disk drive controller connected to said bus at a plurality of ports for receiving and responding to commands from said host computers, a hardware locking circuit in said disk drive array system for controlling operation of said disk drive array, a storage buffer for storing defined vendor data, means, at the host computer, for initializing an inquiry of vendor product data stored in said buffer, said inquiry including at least a switch for requesting a global semaphore hardware lock and an identification of the application making the request, said controller, in response to said inquiry, granting said hardware lock when another application has not secured said hardware lock, and returning to said originating host a vital product data page including an identification of the current holder of the hardware lock.

7. The apparatus of claim 6 further comprising a said host computer having means for forcing a release of a hardware lock in place for at least a predetermined maximum time duration, and said controller, in response to receipt of an inquiry requesting a forced release of said hardware lock, determining whether said time duration had elapsed and releasing an ownership of said hardware lock if it has elapsed.

8. The apparatus of claim 6 further comprising said host computer having means for forcing a reservation of a hardware lock in place for at least a maximum time duration, and said controller, in response to receipt of an inquiry requesting a forced reservation of said hardware lock, determining whether said time duration has passed and modifying an ownership of said hardware lock if it has passed.

9. The apparatus of claim 6 wherein said vital product data page contains at least an identification of which host computer, if any, owns the hardware lock, an identification of the port used by the owning host computer, and a unique host supplied identifier specifying the owner, if any, of the hardware lock.

10. The apparatus of claim 6 wherein said inquiry includes bits identifying a request to read a hardware lock buffer, a request to lock, if possible, the hardware lock, and a forced request.

11. A method for controlling a disk drive array system accessible to a plurality of host computers connected to the system over at least one bus comprising the steps of responding, at the disk drive system, to the receipt of a reserve command from a first host, configured to set a global semaphore for reserving exclusive control of the disk drive system, by setting said global semaphore, when said semaphore is not already set, storing, at the disk drive system, an identification of the host setting the semaphore including information provided by the host, reserving, at the disk drive system, exclusive control of said disk drive system to the host setting said semaphore, and responding, at the disk drive system, to the receipt of a second command from the first host, configured to release said global semaphore and to make said disk drive system available to other hosts, by resetting said global semaphore.

12. The method of claim 11 further comprising the step of responding to said first command, when the semaphore is already set, with a response indicating the old semaphore holder.

13. A method for controlling a disk drive array system accessible to a plurality of host computers connected to the system over at least one bus comprising the steps of responding to the receipt of a reserve command from a first host, configured to set a global semaphore for reserving exclusive control of the disk drive system, by setting said global semaphore, when said semaphore is not already set, storing an identification of the host setting the semaphore including information provided by the host, reserving exclusive control of said disk drive system to the host setting said semaphore, responding to the receipt of a second command from the first host, configured to release said global semaphore and to make said disk drive system available to other hosts, by resetting said global semaphore, and forcibly releasing the disk drive system, in response to a command configured as a Forced Release from a second host, by resetting said semaphore if a predetermined time duration from the last setting of said semaphore has passed.

14. The method of claim 13 further comprising the steps of receiving said first command and said Forced Release command over an enabled vital product data (EVPD) Inquiry command on a SCSI bus, and sending a response from the disk drive system to the host computer over a vital product data page.

15. A method for controlling a disk drive array system accessible to a plurality of host computers connected to the system over at least one bus comprising the steps of responding to the receipt of a reserve command from a first host, configured to set a global semaphore for reserving exclusive control of the disk drive system, by setting said global semaphore, when said semaphore is not already set, storing an identification of the host setting the semaphore including information provided by the host, reserving exclusive control of said disk drive system to the host setting said semaphore, and responding to the receipt of a second command from the first host, configured to release said global semaphore and to make said disk drive system available to other hosts, by resetting said global semaphore, and setting the global semaphore with the identification of the host computer sending a Forced Reserve command for forcing a semaphore reserve command, if a predetermined maximum time duration from a last setting of the semaphore has passed, thereby releasing the original semaphore and setting a new semaphore.

16. A disk drive array system accessible to a plurality of host computers over at least one bus comprising a disk drive controller connected to said bus at a plurality of ports for receiving and responding to commands from said host computers, a hardware locking circuit in said disk drive array system for controlling operation of said disk drive array, a storage buffer for storing defined vendor data, means for receiving an inquiry from said host computers regarding vendor product data stored in said buffer, means for identifying whether said inquiry includes at least a request for a global semaphore hardware lock and an identification of the application making the request, and said controller, in response to said inquiry, granting said hardware lock when another application has not secured said hardware lock, and returning to said originating host a vital product data page including an identification of the current holder of the hardware lock.

17. The system of claim 16 further comprising means for identifying whether an inquiry includes a request for forcing a release of a hardware lock in place for at least a predetermined maximum time duration, and said controller, in response to receipt of an inquiry requesting a forced release of said hardware lock, determining whether said time duration had elapsed and releasing an ownership of said hardware lock if it has elapsed.

18. The system of claim 16 further comprising means for identifying whether an inquiry includes a request for forcing a reservation of a hardware lock in place for at least a maximum time duration, and said controller, in response to receipt of an inquiry requesting a forced reservation of said hardware lock, determining whether said time duration has passed and modifying an ownership of said hardware lock if it has passed.

19. The system of claim 16 wherein said vital product data page contains at least an identification of which host computer, if any, owns the hardware lock, an identification of the port used by the owning host computer, and a unique host supplied identifier specifying the owner, if any, of the hardware lock.

20. The system of claim 16 wherein said identifying means analyzes said inquiry for bits identifying a request to read a hardware lock buffer, a request to lock, if possible, the hardware lock, and a forced request.

* * * * *